J. GETZ AND M. SHIVES.
METHOD AND APPARATUS FOR PREPARING CORN FOR STORAGE.
APPLICATION FILED AUG. 9, 1918.
1,307,046.
Patented June 17, 1919.
2 SHEETS—SHEET 1.
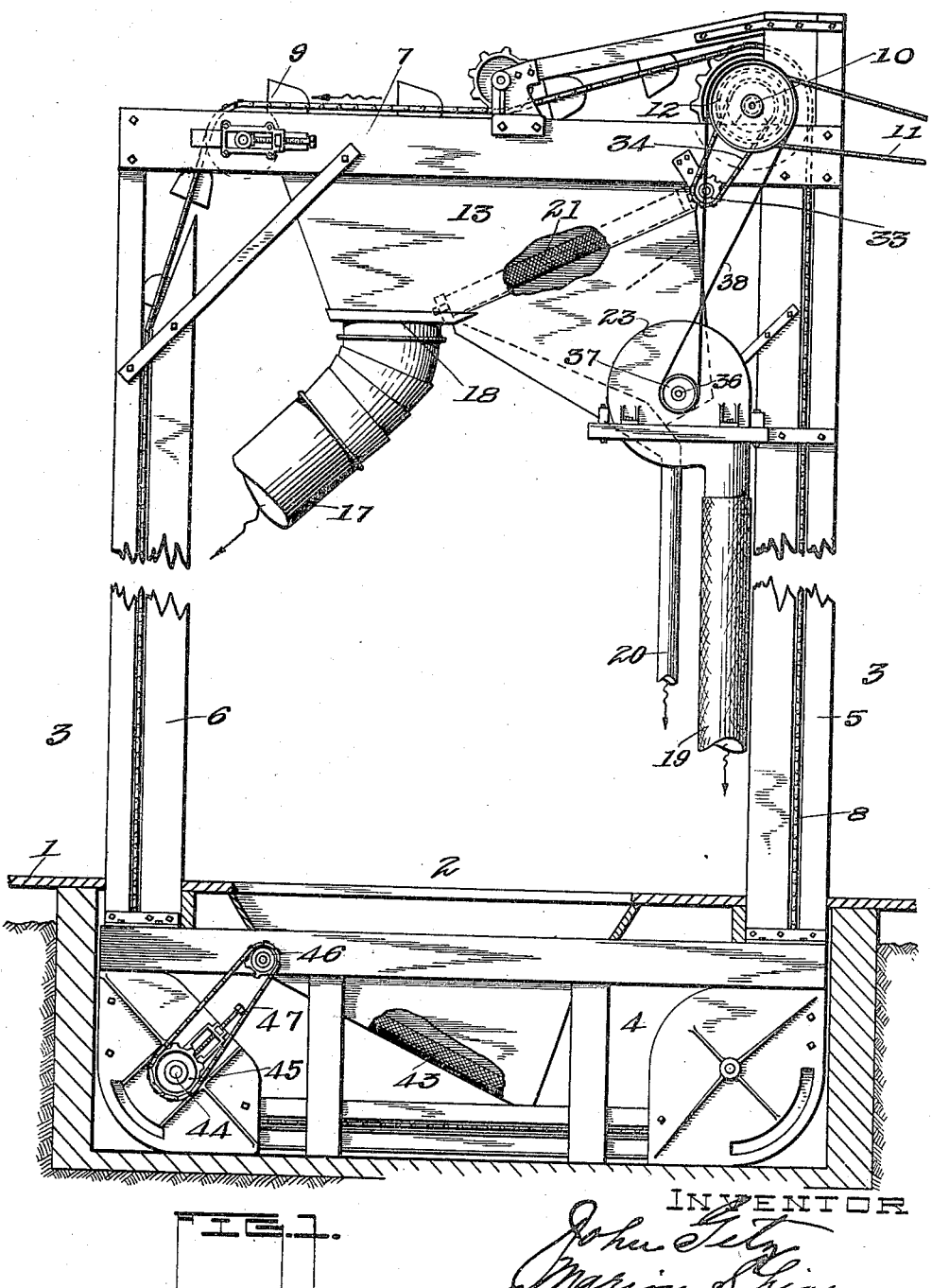

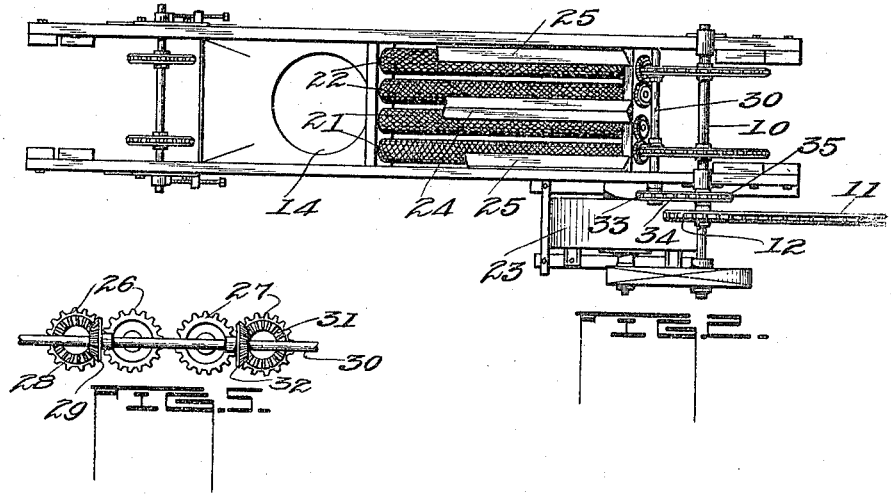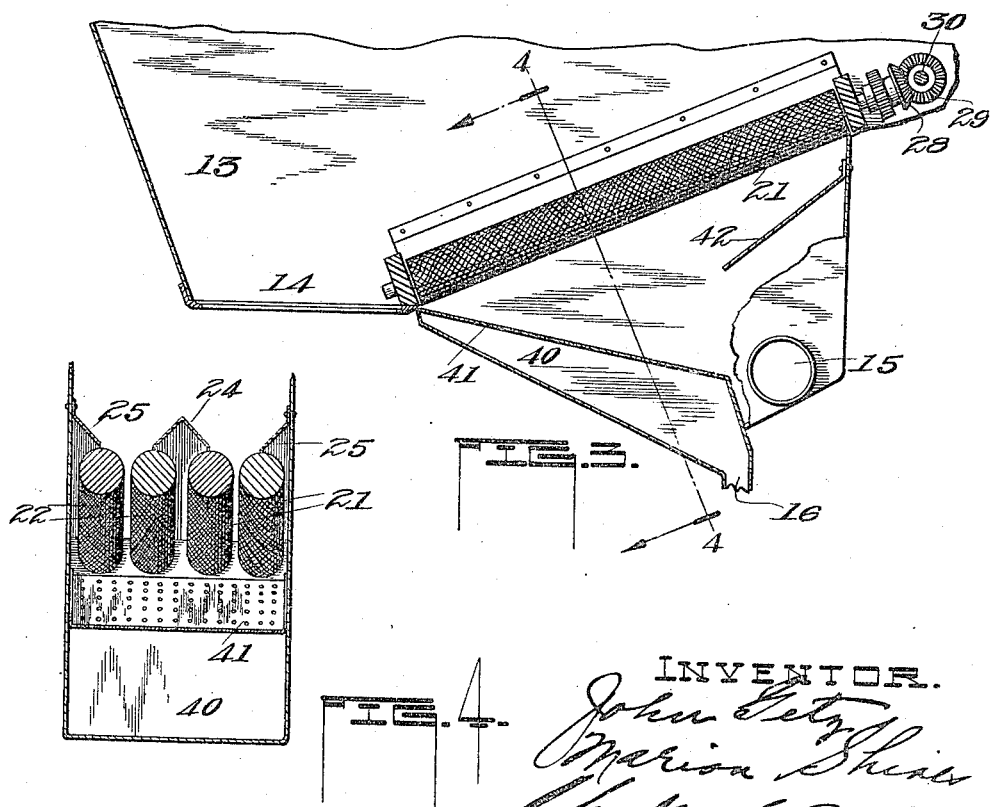

UNITED STATES PATENT OFFICE.

JOHN GETZ, OF MORTON, AND MARION SHIVES, OF YATES CITY, ILLINOIS; SAID SHIVES ASSIGNOR TO SAID GETZ.

METHOD AND APPARATUS FOR PREPARING CORN FOR STORAGE.

1,307,046.     Specification of Letters Patent.     Patented June 17, 1919.

Application filed August 9, 1918. Serial No. 249,096.

*To all whom it may concern:*

Be it known that we, JOHN GETZ and MARION SHIVES, citizens of the United States, residents of Morton and Yates City, in the counties of Tazewell and Knox and State of Illinois, have invented new and useful Improvements in Methods and Apparatus for Preparing Corn for Storage, of which the following is a specification.

This invention has reference to a combined apparatus for elevating ear corn, cleaning it thoroughly of all particles of husks and silks, separating the husks, silks and shelled corn from the ear corn, and distributing the ear corn to bins of a storage crib, and the silks, husks and shelled corn to suitable containers.

In the drawings,

Figure 1 is a side elevation, partly broken away and partly in section, showing an elevating device, cleaner and distributers embodying our invention;

Fig. 2 is a top plan view of the head of the elevator showing the arrangement of the cleaner and suction and blowing fan;

Fig. 3 is an elevation in section showing the cleaning rollers and means of separating the silks and husks from the shelled corn;

Fig. 4 is a cross-section as the same would appear if taken on the line 4—4, Fig. 3, and Fig. 5 is a detail showing the arrangement of the gearing for operating the cleaning rollers.

Like characters of reference denote corresponding parts throughout the figures.

The elevating device disclosed in this application is of that type shown and described in the patent issued to A. F. Meyer, May 4, 1909, No. 920,602, wherein is shown a crib having receiving bins on either side of a drive-way extending through the crib. Such elevating device includes vertical runs disposed upon opposite sides of the driveway and connected by a head and a boot. The boot receives the load as it is dumped from a wagon, the cups of the elevator picking up the material, elevating it to the top of the crib and discharging the material into a spout through which it is distributed to the various bins of the crib. The device of the Meyer patent is very efficient for the purposes for which it is intended, and is used very extensively by farmers.

Every one who is familiar with the handling of shelled corn knows that after it is stored in large elevators it must be moved from time to time to treat it, so as to prevent it from becoming moist by heating and thus molding, resulting in its grading less than desirable and entailing considerable financial loss. This is no less true of ear corn, if the ear corn is placed in the bins of corn cribs, together with husks and silks, as well as some of the loose corn which is shelled during the handling to the bins.

Corn is not now picked as carefully as it formerly was; in fact, it is nearly all carelessly snapped, with much silk and shuck left on the ear. It is obvious, therefore, that when the ear corn, with particles of shucks and silks adhering thereto, is stored in the bins of the cribs on the farms, together with loose corn, which is shelled during the handling, that it will pack, and because the silks and shucks hold moisture, and retain dampness, this will cause the corn to mold and rot, and consequently grade less.

With the use of our apparatus more corn can be picked in the same given time, with less labor, and it is immaterial if to the ears there may cling particles of the silks and shucks, as such shucks and silks will be cleaned from the ears during the elevating and storage operations, distributing the cleaned ears to the various bins in the crib, and the shelled corn to separate containers from that which receives the silks and husks, the latter being sucked away from the ears of corn as it is cleaned therefrom, and then blown to any point it is desirable to discharge the same. The ear corn is discharged into the receiving bins of the crib, free of all silks and shucks and can then dry perfectly and make first grade seed corn.

In the drawings, 1 designates a corn crib, of any preferred design, having a driveway 2 therethrough, and bins 3 on either side of said driveway.

At a suitable point in the crib, there is located in the driveway and beneath the floor thereof, a boot 4 of an elevator, which also includes vertical runs 5 and 6 and a head 7. The elevating means comprises, preferably, the endless chains 8 and the cups 9. We are not concerned with all of the details of the elevator structure, nor the elevating means, except to say that shaft 10 at the head end of the elevator, receives its power from any suitable source through the chain 11 which actuates the sprocket wheel 12 on said shaft 10. The corn which is dumped into the boot 4 from a wagon or other container is picked up by the cups 9, elevated in the run 5 and discharged into the hopper receptacle 13, suspended from the head 7 of the elevator, and located between the runs 5 and 6.

The hopper receptacle has preferably three discharge outlets 14, 15 and 16. Through the outlet 14 passes the ear corn, which has been cleaned of all silks and shucks, and the same dropping into the, preferably, telescopic spout 17 is conveyed or transferred to any bin or bins of the crib. This spout has also, preferably, a swivel connection at 18 with the hopper receptacle, so it may be swung into different positions. Through the outlet 15 is drawn, by means of a fan, to be described, all silks, shucks and dirt cleaned from the ear corn, and the same blown through a flexible spout 19 to a suitable container. Through the outlet 16 passes any loose corn shelled from the ears during the elevating and cleaning operations, and the same dropping into the spout 20 is conveyed to any point of discharge.

Arranged preferably, in an inclined position in the hopper 7, and beneath the upper transverse run of the elevator, are two pairs of cleaning rollers 21, 21 and 22, 22 onto which is dropped the ear corn from the cups 9, and as such ears of corn pass down along the rollers 21 and 22 to the outlet opening 14 in the hopper, said rollers, which may be milled or provided with any cleaning means, will tear from the ears, whatever silks and shucks remain thereon, and the same passing down between the pairs of rollers 21, 21 and 22, 22 will be drawn out through the discharge outlet 15, by means of the suction and blowing fan 23, and said silks and shucks blown out through the spout 19 to the place of discharge. Between the pairs of rollers 21 and 22 and overlying the space therebetween is a deflector 24. A similar deflector 25 is placed between the wall of the hopper and each outside roller 21 and 22 and overlying the space therebetween. These deflectors insure the ears of corn dropping onto the surfaces of the adjoining rollers 21, 21 and 22, 22 of each pair, and said rollers of each pair of rollers revolving toward each other will insure the cleaning of all silks and shucks from the ears of corn.

The rollers 21, 21 are geared together by gear wheels 26, 26 and the rollers 22, 22 are geared together by gear wheels 27, 27. One of the rollers 21 has a bevel gear wheel 28 meshing with a bevel gear wheel 29 on a shaft 30, and one of the rollers 22 has a bevel gear wheel 31 meshing with a bevel gear wheel 32, also on the shaft 30. The shaft 30 also has a sprocket wheel 33 actuated by a chain 34, which in turn is operated by a sprocket wheel 35 on the shaft 10.

The outlet opening 16 for the shelled corn leads from a compartment 40, the upper wall of which is a foraminated sheet 41 onto which the shelled corn, if there is any, and the silks and shucks will drop when cleaned from the ears. Said foraminated sheet 41 is inclined rearwardly, or just in the opposite direction to the inclination of the rollers 21, 21 and 22, 22. Located beneath and near the upper ends of the rollers 21, 21 and 22, 22 is a short inclined partition 42 which will direct the silks and shucks, and shelled corn onto the foraminated sheet 41; the shelled corn passing through the openings in said foraminated sheet 41 will find their way to the spout 20 through the outlet 16, and the silks and shucks will be drawn by the suction fan 23 out through the outlet 15, and then blown through the spout 19 to the point of discharge.

In Fig. 1 we have shown that cleaning rollers 43 similar in number and arrangement to the rollers 21, 21 and 22, 22, may be provided in the boot 4, onto which the ear corn is dumped, and which will perform certain preliminary operations on the ear corn to remove the silks and shucks, which will be picked up by the cups 9 and elevated into the hopper 13. The rollers 43 may be driven from one of the lower shafts 44 of the elevator, by means of sprocket wheels 45 and 46, and a chain 47, and also other gearing, not shown. The rollers 43 may or may not be used, just as desired.

What we claim is:

1. The herein described continuous method of preparing corn for storage, which resides in first subjecting the corn to an initial rough husking, then in conveying the ears after said initial rough husking to an elevated point, removing the silk and husk particles from the ears while elevated, discharging the cleaned ears by the force of gravity and directly storing same, discharging by gravity combined shelled corn grains, silk and husk particles, separating the combined silk and husk particles from the shelled corn grains and then conveying by gravity the combined silk and husk particles to one receiving point and the shelled corn grains to another receiving point.

2. The herein described continuous method of preparing partially husked corn for storage, which resides in conveying the ears to an elevated point, removing the silk and husk particles from the ears while elevated, discharging the cleaned ears by force of gravity and leading same to a point of storage, discharging by gravity combined shelled corn grains, silk and husk particles, separating the combined silk and husk particles from the shelled corn grains and then conveying by gravity the combined silk and husk particles to one receiving point and the shelled corn grains to another receiving point.

3. The herein described continuous method of preparing corn for storage, which resides in subjecting partially husked corn to a rough husking, then in conveying the ears after such rough husking, together with silk and husk particles to an elevated point, discharging by gravity the ears, silk and husk particles and shelled corn grains into a separator, separating the ears from the silk and husk particles and shelled corn grains, and discharging the ears by the force of gravity and directly storing same, separating the combined silk and husk particles from the shelled corn grains and then conveying by gravity the combined silk and husk particles to one receiving point and the shelled corn grains to another receiving point.

4. In a device for automatically preparing corn for storage, means to partially husk ears of corn, means to receive the partially husked ears of corn and to convey the same to an elevated point above said partial husking means, means at said elevated point for removing the silk and husk particles from said partially husked ears and for discharging the cleaned ears by the force of gravity, means below said removing means to receive the silk and husk particles and the shelled corn therefrom and to separate the shelled corn from said particles and to discharge said particles and shelled corn by the force of gravity, conveying means to conduct the combined silk and husk particles to one receiving point and the shelled corn to a separate receiving point, and means to effect simultaneous operation of the conveying and silk and husk removing means.

5. In a device for automatically preparing corn for storage, means to partially husk ears of corn, a unitary receiver disposed at an elevation above said husking means, means to receive the partially husked ears of corn and to convey the same to the receiver, means in the receiver to remove the silk and husk particles from said partially husked ears and to discharge the cleaned ears of corn from the receiver, means arranged below the silk and husk removing means to receive the shelled corn and the silk and husk particles by the force of gravity, means to conduct the shelled corn to one receiving point, means to conduct the silk and husk particles to a separate receiving point, and means to effect simultaneous operation of the conveying silk and husk removing means.

In witness whereof, we have hereunto affixed our hands this 5th day of July, 1918.

JOHN GETZ.
MARION SHIVES.

Copies of this patent may be obtained for five cents each, by addressing the "Commissioner of Patents, Washington, D. C."